United States Patent [19]
Preston

[11] 3,926,923
[45] Dec. 16, 1975

[54] AROMATIC POLYESTER-AMIDES
[75] Inventor: Jack Preston, Raleigh, N.C.
[73] Assignee: Monsanto Company, St. Louis, Mo.
[22] Filed: Mar. 7, 1974
[21] Appl. No.: 448,846

Related U.S. Application Data
[63] Continuation-in-part of Ser. No. 352,846, April 19, 1973, abandoned.

[52] U.S. Cl.... 260/78 R; 260/29.2 N; 260/32.6 NA; 260/75 N; 260/76.47 CZ
[51] Int. Cl.² .......................................... C08G 69/44
[58] Field of Search .................. 260/78 R, 76, 75 N

[56] References Cited
UNITED STATES PATENTS
2,831,831   4/1958   Caldwell et al. ...................... 260/47

FOREIGN PATENTS OR APPLICATIONS
1,182,377   2/1970   United Kingdom

Primary Examiner—Howard E. Schain
Attorney, Agent, or Firm—Stanley M. Tarter; John W. Whisler

[57] ABSTRACT

There is provided a new and useful class of aromatic polyesteramides having the repeating amide structural unit

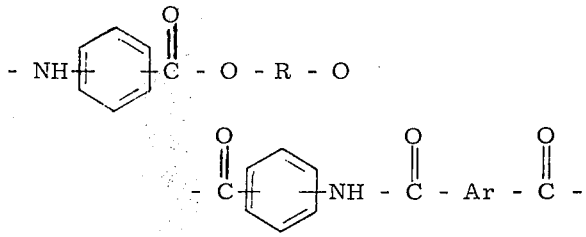

wherein R is a branched or linear $C_2$-$C_8$ alkylene radical and Ar is an aromatic nucleus. The polymers have high molecular weight and are suitable for preparing fiber, films and the like.

9 Claims, No Drawings

AROMATIC POLYESTER-AMIDES

This application is a continuation-in-part application of application Ser. No. 352,846, filed Apr. 19, 1973, now abandoned.

BACKGROUND OF THE INVENTION

Much effort is being devoted in the man-made filament industry to produce at reasonable cost fibrous articles that are more flame resistant. This is out of the concern for the safety of inhabitants of the buildings where drapes and especially carpets are nowadays in widespread and common use. Unfortunately, the approach to increased flame resistance through the use of halogens in the polymeric compositions of the fibrous material leads to fibers which generate much smoke which is a real hazard to the inhabitants. The smoke may be very toxic and may obscure the means of egress from the burning buildings.

Recently, some wholly aromatic fibers have been disclosed and are flame-resistant and during exposure to a hot flame generate a low amount of smoke. One such fiber is an aromatic polyamide based on poly-m-phenyleneisophthalamide. Another recently disclosed fiber having flame flame-retardance and low smoke generation is made from poly-m-phenylene-2,2'-5,5'-bibenzimidazole. These two known fibers are rather expensive for general use and their high price deters their general use for carpets. Consequently, a new cheaper fiber having flame-resistance and low smoking qualities has been sought by the trade. The present invention meets this need in the provision of new and useful low cost, flame-resistant polyesteramide fibers for the preparation of carpets and the like which generate little smoke when exposed to fire.

Aromatic polyester-amides of various types are known. However, the difficulties encountered in the synthesis of the polymer-forming reactants, at least with respect to the high melting types, have precluded their development to polymers useful for fibers. Laakso et al disclosed in J. Am. Chem. Soc., 82, 3640 (1960) the synthesis of a polyamide-ester via ester interchange with a diester containing preformed amide linkages in accordance with the following equations where $x = 6$ to 8 and $y = 4$ to 6. The melting points of the polymers are so high that solidification occurs in the early stages of the polymerization with the result that low molecular weight products are produced. Further, such polymers made via melt polycondensation are extremely insoluble and the melting points are so high that melt spinning thereof is precluded.

Another type of polyamide-ester disclosed by Laakso et al has the following repeating units

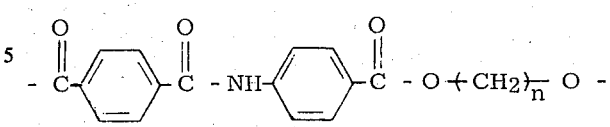

where $n = 2$ to 4. Such polymers melt above 300°C. and solidify in the early stages of polymerization to yield low molecular weight products.

French Pat. No. 2.059,348 discloses polymers of repeating ester units containing preformed amide units. The polycondensation of the polyester-forming reactant is carried out using a catalyst.

In accordance with the present invention a polymer of repeating amide units containing preformed ester units is provided. As a means to preparing a lower cost fiber, advantage is taken of: (1) building up a preformed diamine block by means of a polyester reaction which is quite economical and (2) polycondensing the preformed diamine block with a diacid chloride. The preformed block containing internal ester groups requires a lower amount of acid chloride per pound of polymer because of its high molecular weight than does a simpler diamine such as m-phenylenediamine.

SUMMARY OF THE INVENTION

There is provided a fiber-forming high molecular

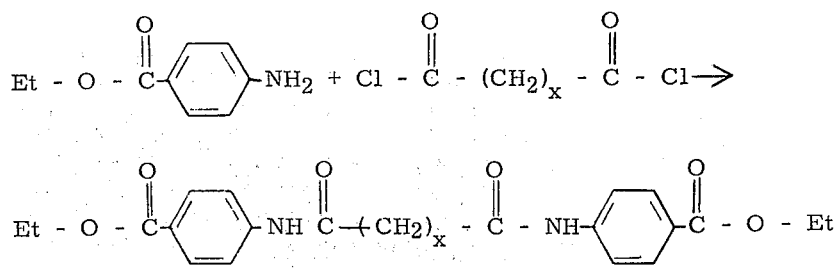

The resulting diester was reacted with HO $(CH_2)_y$ OH to produce a polymer having the following repeating unit with the evolution of ethanol weight aromatic polyester-amide composed preferably of at least 35% and more preferably of at least 75% by weight of the repeating amide structural unit

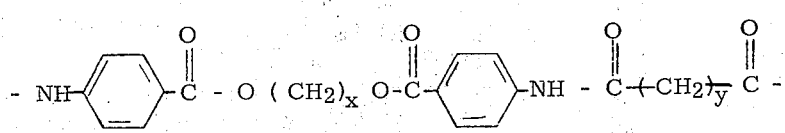

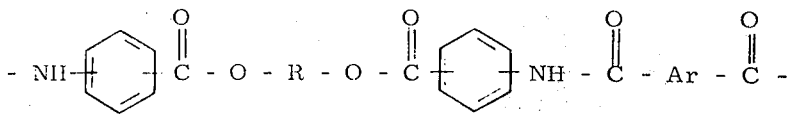

wherein R is a branched or linear $C_2$–$C_8$ alkylene radical and Ar is an aromatic nucleus which may have 0 to 4 halogen substituents. Either or both phenylene groups may have 0 to 4 halogen substituents. Films and fibers having flame retarding properties and low smoke generation when burned can be shaped from these aromatic polyester-amides. Such polymers can be conveniently made by known solution and interfacial polymerization techniques by reacting an aromatic diacid halide with an aromatic diamine having preformed ester units.

DETAILED DESCRIPTION OF THE INVENTION

The high molecular weight polymers of this invention are prepared by reacting at low temperatures (below 100°C.) a mixture composed of at least one aromatic dicarboxylic acid halide and at least one aromatic diamine having preformed ester units.

Halides of dibasic aromatic acids useful as reactants in preparing polymers of the invention are compounds of the formula

wherein X is a halogen atom selected from the group consisting of chlorine, bromine and fluorine. Of these halogens chlorine is preferred. Ar is a divalent aromatic radical, i.e., it contains resonant unsaturation. The aromatic radical may have a single, multiple, or fused ring structure. Preferably, the Ar radical is either

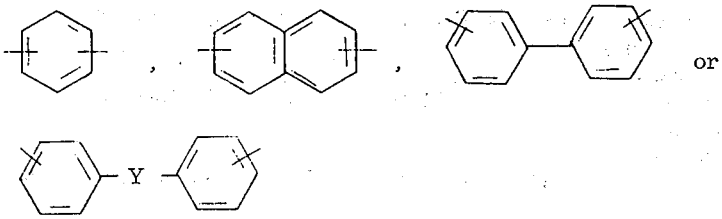

wherein Y is either a branched or linear $C_1$–$C_4$ alkylene radical,

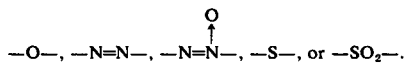

The Ar radical may contain 0–4 halogen substituents for even better flame retardancy.

Among the specific aromatic dicarboxylic acids from which the halides can be made are isophthalic acid, terephthalic acid, tetrachloroterephthalic acid, 2,5-dichloroterephthalic acid, 1,5-naphthalenedicarboxylic acid, 1,4-naphthalenedicarboxylic acid, 1,6-naphthalenedicarboxylic acid, 1,7-naphthalenedicarboxylic acid, 2,4-naphthalenedicarboxylic acid, 2,5-naphthalenedicarboxylic acid, 2,6-naphthalenedicarboxylic acid, 2,7-naphthalenedicarboxylic acid, 2,8-naphthalenedicarboxylic acid, 2,2'-bibenzoic dicarboxylic acid, 3,3'-bibenzoic dicarboxylic acid, 4,4'-bibenzoic dicarboxylic acid, 2,3'-bibenzoic dicarboxylic acid, 3,4'-bibenzoic dicarboxylic acid, 2,2'-isopropylidene dibenzoic acid, 3,3'-isopropylidene dibenzoic acid, 4,4'-isopropylidene dibenzoic acid, 2,3'-isopropylidene dibenzoic acid, 3,4'-isopropylidene dibenzoic acid, 2,2'-methylene dibenzoic acid, 3,3'-methylene dibenzoic acid, 4,4'-azobenzene dicarbonyl chloride, 4,4'-azoxybenzene dicarbonyl chloride, 4,4'-methylene dibenzoic acid, 2,2'-ethylene dibenzoic acid, 4,4'-ethylene dibenzoic acid, 2,2'-hexafluoroisopropylidene dibenzoic acid, 4,4'hexafluoroisopropylidene dibenzoic acid, 2,2'-ketodibenzoic acid, 3,3'-ketodibenzoic acid, 4,4'-ketodibenzoic acid, 2,2'-oxydibenzoic acid, 4,4'-oxydibenzoic acid, 4,4'-thiodibenzoic acid, 2,2'-thiodibenzoic acid, 3,3'-thiodibenzoic acid, 2,2'-sulfonedibenzoic acid, 3,3'-sulfonedibenzoic acid, 4,4'-sulfonedibenzoic acid and the like. The preferred dicarboxylic acids are isophthalic acid and terephthalic acid.

The diamines useful as reactants in preparing polymers of the invention are compounds of the formula

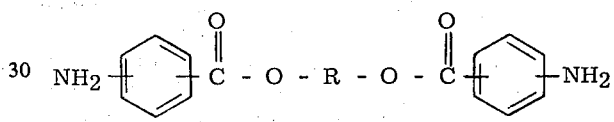

wherein R is a linear or branched $C_2$–$C_8$ alkylene radical. Among these diamines are 1,2-ethylene-bis(p-aminobenzoate), 1,2-ethylene-bis(m-aminobenzoate), 1,2-propylene-bis(p-aminobenzoate), 1,2-propylene-bis(m-aminobenzoate), 1,2-propylene-bis(o-aminobenzoate), 2,2-dimethyl-1,3-propane-bis(p-aminobenzoate), 2,2-dimethyl-1,3-propane-bis(m-aminobenzoate), 2,2-dimethyl-1,3-propane-bis(o-aminobenzoate), 1,4-butylene-bis(p-aminobenzoate), 1,4-butylene-bis(m-aminobenzoate) and the like. Halogenated derivatives of these just mentioned diamines, such as 1,2-ethylene-bis(4-amino-2-chlorobenzoate), are also useful and provide added flame retardancy. The preferred diamine is 1,2-ethylene-bis(p-aminobenzoate).

In many instances it is advantageous to employ a mixture of diamines in the preparation of suitable copolymers. In such case the mixture would include about 35 weight percent or more of one or more of the just mentioned diamines containing ester linkages and simpler aromatic diamines of the formula

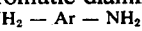

wherein Ar is a divalent aromatic radical, i.e., it contains resonant unsaturation. The aromatic radical may have a single, multiple, or fused ring structure. Preferably, the Ar radical is either

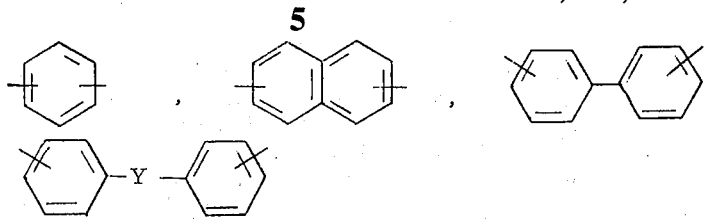

wherein Y is either a branched or linear $C_1$–$C_4$ alkylene radical,

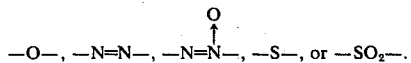

The Ar radical may be halogen substituted. Among such simpler diamines are meta-phenylene diamine, para-phenylene diamine, diamino 1,5-naphthalene, 4,4'-benzidine, 2,2'-isopropylidene-4,4'-methylenedianiline, and the like.

A method of preparing the diamines containing ester linkages is disclosed in copending U.S. Pat. application Ser. No. 353,285 filed Apr. 23, 1973. In accordance with that method a mixture of a nitrobenzoic acid and a suitable glycol is reacted at elevated temperature to form an alkylene-bis(nitrobenzoate). The resulting nitrobenzoate is hydrogenated to form the diamine having preformed internal ester units.

The following example illustrates the practice of the present invention.

EXAMPLE I

In this example 1,2-ethylene-bis(p-aminobenzoate) was prepared.

A 10 gallon stirred autoclave was charged with 9070 grams of p-nitrobenzoic acid and 6740 grams of ethylene glycol. The system was flushed with nitrogen gas. Then, the contents of the reactor were heated to 180°–185°C. over about 75 minutes and held at that temperature for one hour. During this time water and glycol were distilled and collected. The temperature of the contents of the reactor was raised to 210°C. and maintained at this temperature for 2 hours to distill the excess glycol.

The temperature of the reaction mass was cooled to 100°C. and 9070 grams more of p-nitrobenzoic acid was added and then heated to 180°C. over 30 minutes. After 2 hours at this temperature the pressure on the system was reduced to approximately 60 mm. of Hg for one hour while maintaining the 180°C. temperature in the autoclave. After cooling the reactants to 150°C. over thirty minutes, the vacuum was broken with nitrogen gas. Four gallons of N,N-dimethylacetamide was added to the autoclave. After adequate mixing, the resulting hot solution was discharged from the reactor and one gallon of N,N-dimethylacetamide was used to rinse the reactor. To the combined solution plus rinse in a 30 gallon drum were added 2 gallons of hot water and the mixture was allowed to stir very slowly for 12 hours. A precipitant formed.

The precipitated product was filtered. The filtrate was returned to the drum and heated to about 90°C. by sparged steam. Seven gallons of hot water was added, the mixture was stirred for one hour, and a second crop of precipitated product was taken. The wet filter cakes were reslurried in the drum for one hour with 10 gallons of water containing 3.5 lb. of sodium carbonate. After filtering, the product was washed with water and dried overnight at 50°C. in a forced air tray drier. An 86.5% yield of 1,2-ethylene-bis(p-nitrobenzoate) was obtained.

The ethylene-bis(p-nitrobenzoate) was reduced to ethylene-bis(p-aminobenzoate). This was carried out in 20 lb. lots by hydrogenation in the autoclave using N,N-dimethylacetamide as solvent and Raney nickel as catalyst at a reaction temperature of 120°C. and a pressure of 8 atmospheres. A 91.7% yield of diamine was obtained. The diamine had a melting point of 222°–223°C.

EXAMPLE II

To a solution of 0.75 gram (0.0025 mole) of 1,2-ethylene-bis(p-aminobenzoate) of Example I, in 4 ml of N,N-dimethylacetamide at 0°C. was added 0.5 gram (0.0025 mole) of isophthaloyl chloride with stirring. Stirring was continued for 20 minutes. The contents were allowed to rise to room temperature over a period of 30 minutes. Films from the resulting polymer solution were spread on a glass plate and baked at 110°C. to remove the solvent. It was noted that a clear, tough film was obtained. Exposure of the film to a flame showed that the film would burn but little smoke was generated. A strong tendency of the film to intumesce was noted.

EXAMPLE III

This example illustrates the preparation of the polyester-amides of the present invention via interfacial polymerization.

To a slurry of 1.93 gram (0.0064 moles) of 1,2-ethylene-bis(p-aminobenzoate) in 100 mls of water containing 0.1 gram surfactant and 1.3 gram sodium carbonate, 10 mls of tetrahydrofuran, and some ice was added a solution of 1.3 gram (0.0064 mole) of isophthaloyl chloride in 20 mls of tetrahydrofuran. The mixture was stirred vigorously in a Blendor jar for 10 minutes. Then, the resultant emulsion was broken by addition of dilute HCl solution until the mixture was acidic. Addition of ethanol coagulated the polymer. Thereupon, the polymer was collected, washed and dried.

A disk was pressed from the above finely divided polymer by placing 2 grams of the polymer in a die, inserting a piston, and applying 25 tons of pressure to the piston. When the disk was placed in an open gas-fired flame, the polymer disk softened, intumesced strongly (i.e., the portion of the disk in the flame increased in thickness several fold) and the foamed polymer was converted rapidly to char.

EXAMPLE IV

Example II was repeated except that terephthaloyl chloride was used instead of isophthaloyl chloride. The resulting film was exposed to a flame showed less tendency to intumesce upon burning than the film of Example II.

EXAMPLE V

This example illustrates the preparation of polymer in Example II on a larger scale and the preparation of fibers therefrom.

To a dry resin kettle was added 30 grams (0.1 mole) of 1,2-ethylene-bis(p-aminobenzoate) and 100 ml of pure, dry N,N-dimethylacetamide. The resulting solution was cooled to −30°C. with stirring and 20.3 grams (0.1 mole) of isophthaloyl chloride was added all at once. After about 20 minutes the bath was replaced with a 0°C. bath and the viscosity of the solution was observed to increase rapidly. An additional 40 mls of N,N-dimethylacetamide was added to dilute the solution of polymer. Neutralization of the solution was effected by addition of 8.4 grams of lithium hydroxide hydrate.

Polymer was recovered from the solution by precipitation in water. The recovered polymer was chopped in a Blendor jar, dried, and redissolved in N,N-dimethylacetamide containing 3% dissolved lithium chloride. The polymer constituted 30% by weight of the solution. The solution was extruded through a spinnerette into a coagulating bath to form filaments. The filaments were washed, dried, drawn and collected. The physical properties of the filaments were: 5 denier per filament; tenacity of 4.6 grams per denier; elongation-to-break of 14% and an initial modulus of 111 grams per denier.

Additional amounts of polymer were made following the present example. The new polymer had an inherent viscosity of 1.9 as measured in N,N-dimethylacetamide containing 5% dissolved lithium chloride at 25°C. Additional samples of yarn were made using the wet spinning technique just described. The physical properties of one yarn sample were determined to be: 5.3 denier per filament; a tenacity of 5.2 grams per denier; an elongation-at-break of 20%; and an initial modulus of 94. The physical properties of a second yarn sample were determined to be 10.0 denier per filament; a tenacity of 5.0 grams per denier; an elongation-at-break of 15%; and an initial modulus of 110. Knots strengths for the two additional yarns were, respectively, 90 and 91%. The melting point of the yarn as determined by differential thermal analysis was 355°C.

Then knitted tubings were prepared from the samples of this example and subjected to burning tests. It was found that the knitted fabric when subjected to a burning test had an oxygen index value of about 25. The amount of smoke generated on burning of the fabric was low.

In addition to the excellent tensile properties and burning characteristics of the fiber of this example, the fiber has outstanding resistance to light. Thus, after 200 hours exposure in a Fade-Ometer the fiber retains 81% of its original strength and is still white in color. Fiber from poly-m-phenyleneisophthalamide retains only 47% of its original tenacity after only 20 hours in the Fade-Ometer and rapidly takes on a bronze-colored appearance.

EXAMPLE VI

The polymer preparation procedure as set forth in Example V was followed to prepare 4 gallons of polymer spinning solution. Instead of using lithium hydroxide hydrate to neutralize the solution, anyhdrous lithium carbonate was used for this purpose. A total of about 35 pounds of fiber were prepared. The physical properties of the resulting yarn were: 15 denier per filament; tenacity of 4.0 grams per denier; elongation-at-break 40%; and an initial modulus of 60. Knot strength was 3.6 g/den. Other properties which are quite important for the processing of carpets through dyeing operation include hot-wet properties. In this report the polyesteramide fiber is outstanding. Thus at 160°, 180°, and 200°F. in water the tenacities are, respectively, 2.6, 2.5, and 2.3 g/den., while the initial moduli are 40, 32, and 28 g/den. The yarn was crimped, cut to staple length, carded and spun into carpet yarn. Carpets in plush construction and in level loop construction were prepared. A hexamethylenetetramine pellet weight 0.15 gram was placed in the center of 4-inch square samples of these carpets and was ignited. The flame was not propagated along the pile of the carpet samples. Hence, each carpet passed the "pill" test.

Smoke evaluation of the yarn under flaming conditions revealed that the yarn was comparable to yarn made from poly-m-phenyleneisophthalamide.

EXAMPLE VII

The procedure of Example V was repeated except that the solvent employed was N,N-dimethylacetamide containing 5% dissolved lithium chloride and that the diacid chloride was terephthaloyl chloride. Fibers from the resulting polymer showed good strength; and initial moduli of about 200 grams per denier were observed. The melting point of the fiber by differential thermal analysis was 440°C. The fiber burned with only a moderate amount of smoke and with little tendency to intumesce.

EXAMPLE VIII

A small scale polymerization was carried out as in Example II using the ortho- and meta-isomers of 1,2-ethylene-bis(aminobenzoate). The ortho-diamine produced a white polymer which was relatively low in solubility in the polymerization medium. The meta-diamine produced highly soluble polymers from which excellent clear films were produced.

EXAMPLE IX

A small scale polymerization was carried out as in Example II using a 50/50 mixuture of ortho- and para-isomers of the diamine. In a second polymerization a 50/50 mixture of ortho- and meta-isomers of the diamine was employed. In both cases excellent clear films were produced.

EXAMPLE X

This example illustrates that a mixture of diamines may be used wherein an aromatic diamine may be used in part for the alkylene-bis (aminobenzoate) without substantial sacrifice in properties.

A random copolymer of 1,2-ethylene-bis(p-aminobenzoate) and m-phenylene-diamine (50:50 by weight of these diamines) was prepared using isophthaloyl chloride as in Example II. Excellent films were prepared which showed a tendency to intumesce on burning.

By following the polymerization procedure of Example II, other copolymers were prepared using (1) isophthaloyl chloride and a 50/50 weight of mixture of 4,4'-methylenedianiline and 1,2-ethylene-bis(p-aminobenzoate), (2) isophthaloyl chloride and a 50/50 weight mixture of N,N'-m-phenylene-bis-(m-aminobenzamide) and 1,2-ethylene-bis(p-aminobenzoate), and (3) isophthaloyl chloride and a 50/50 weight mixture of oxydianiline and 1,2-ethylene-bis(p-aminobenzoate).

Excellent films were produced.

EXAMPLE XI

A solution of 0.342 gram (0.001 mole) of 2,2-dimethyl-1,3-propane-bis(p-aminobenzoate) in 1.4 ml of N,N-dimethylacetamide was cooled to −10°C. and 0.203 gram (0.001 mole) of terephthaloyl chloride was added with stirring. After 20 minutes at −10°C., the solution was allowed to warm to room temperature and stirring was continued another 20 minutes. Films were cast from the viscous solution.

EXAMPLE XII

The procedure of Example XI was repeated using instead 0.001 mole of 1,4-butane-bis(p-aminobenzoate).

EXAMPLE XIII

A solution of 0.369 gram (0.001 mole) of 1,2-ethylene-bis(4-amino-2-chlorobenzoate) in 2.0 ml of N,N-dimethylacetamide containing 5% dissolved lithium chloride was cooled to −10°C. and 0.203 gram (0.001 mole) of terephthaloyl chloride was added with stirring. After 20 minutes at −10°C., the solution was allowed to warm to room temperature and was stirred for an additional 20 minutes. Strong films were cast from the viscous solution. Ignition of these films was slightly more difficult than in the case of the non-halogen substituted films but generation of smoke was slightly heavier, probably due to the presence of by-product HCl on burning.

The above reaction was also carried out using isophthaloyl chloride and N,N-dimethylacetamide as solvent.

EXAMPLE XIV

A solution of 30.0 gram (0.1 mole) of 1,2-ethylene-bis(p-aminobenzoate) in 130 ml of N,N-dimethylacetamide was cooled to −50°C. and a mixture of 18.27 gram (0.09 mole) of isophthaloyl chloride and 3.41 gram (0.01 mole) of tetrachloroterephthaloyl chloride added with stirring. After 30 minutes the solution was allowed to warm to −10°C. and after another 30 minutes to 0°C. at which temperature it was held for 30 minutes. Next, the solution was allowed to warm to room temperature and neutralized with lithium hydroxide monohydrate. Films were cast from the dope and these films showed increased flame resistance compared to the polyester-amide control which contained no halogen. However, the films burned with the generation of slightly more smoke, probably because of the generation of HCl.

I claim:

1. A high molecular weight fiber-forming polymer composed of recurring units selected from the group consisting of

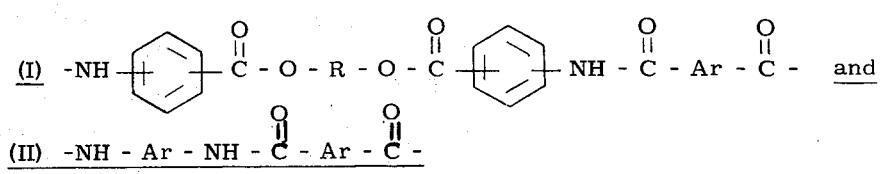

wherein R is a branched or linear $C_2$–$C_8$ alkylene radical and each Ar is individually selected from the group consisting of

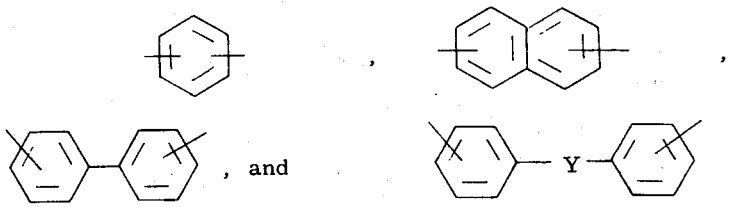

wherein Y is selected from the group consisting of a branched or linear $C_1$–$C_4$ alkylene radical

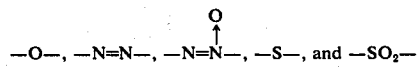

and wherein at least 35% by weight of the polymer is composed of units (I).

2. A textile fiber having flame retardancy and when burned generating a low level of smoke, said fiber being composed of a high molecular weight aromatic polyester-amide consisting essentially of repeating units selected from the group consisting of

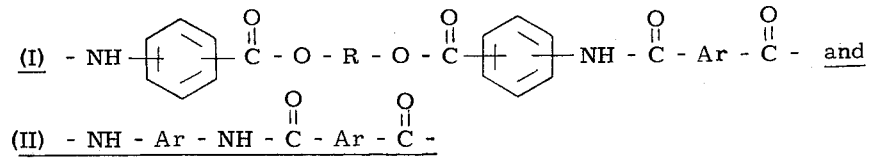

wherein R is a branched or linear $C_2$–$C_8$ alkylene radical and Ar is selected from the group consisting of

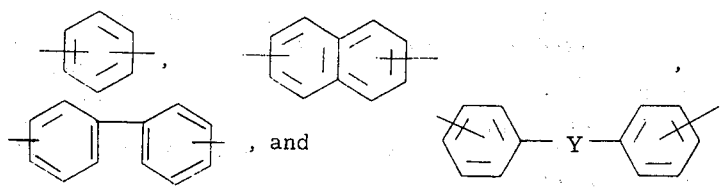

, and wherein Y is selected from the group consisting of a branched or $C_1$–$C_4$ alkyelen radical, $$-O-, -N=N-, -\overset{\overset{O}{\uparrow}}{N=N}-, -S-, \text{ and } -SO_2-$$

and wherein at least 35% of the polyester-amide is composed of units (I).

3. The polymer of claim 1, wherein unit (I) is of the formula

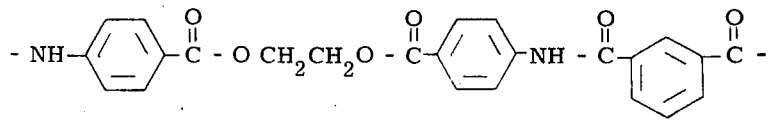

4. The polymer of claim 1, wherein unit (I) is of the formula

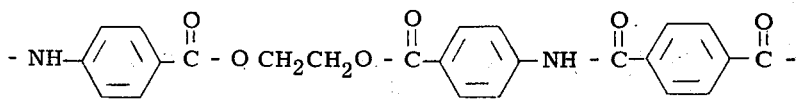

5. The polymer of claim 1, wherein unit (I) is of the formula

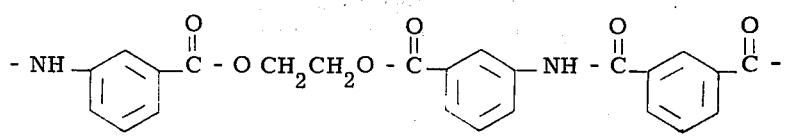

6. The polymer of claim 1, wherein unit (I) is of the formula

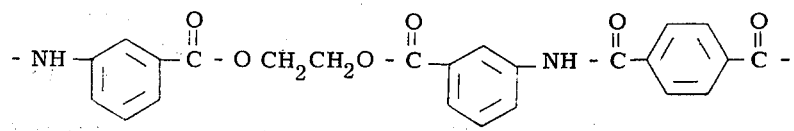

7. The polymer of claim 1, wherein unit (I) is of the formula

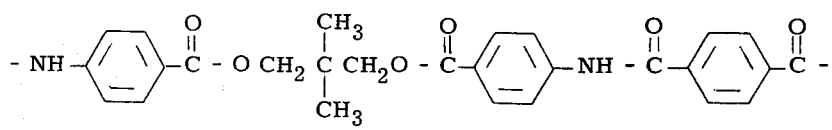

8. The polymer of claim 1, wherein unit (I) is of the formula

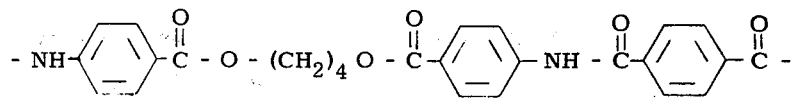

9. The polymer of claim 1, wherein unit (I) is of the formula

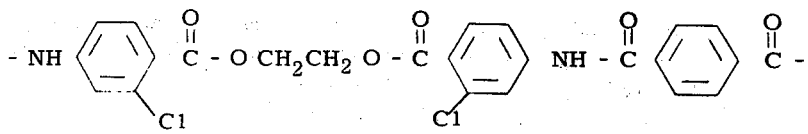

* * * * *